(12) United States Patent
Löfberg et al.

(10) Patent No.: US 9,821,982 B2
(45) Date of Patent: Nov. 21, 2017

(54) CALL PANEL FOR AN ELEVATOR

(71) Applicant: KONE Corporation, Helsinki (FI)

(72) Inventors: Niklas Löfberg, Sipoo (FI); Timo Tiainen, Vantaa (FI); Maija Pursiainen, Vantaa (FI); Rauno Hatakka, Riihimäki (FI)

(73) Assignee: KONE CORPORATION, Helsinki (FI)

( * ) Notice: Subject to any disclaimer, the term of this patent is extended or adjusted under 35 U.S.C. 154(b) by 467 days.

(21) Appl. No.: 14/549,950

(22) Filed: Nov. 21, 2014

(65) Prior Publication Data

US 2015/0075919 A1 Mar. 19, 2015

Related U.S. Application Data

(63) Continuation of application No. PCT/FI2013/050618, filed on Jun. 6, 2013.

(30) Foreign Application Priority Data

Jun. 7, 2012 (FI) ..................................... 20125625

(51) Int. Cl.
*B66B 1/34* (2006.01)
*B66B 1/46* (2006.01)
*B66B 3/02* (2006.01)
*G05B 19/409* (2006.01)
*H01H 13/02* (2006.01)

(52) U.S. Cl.
CPC .............. *B66B 1/468* (2013.01); *B66B 1/462* (2013.01); *B66B 3/02* (2013.01); *B66B 3/023* (2013.01); *G05B 19/409* (2013.01); *G05B 2219/45014* (2013.01); *H01H 13/023* (2013.01); *H01H 2221/016* (2013.01)

(58) Field of Classification Search
CPC B66B 1/468; B66B 1/462; B66B 3/02; B66B 3/023; G05B 19/409; G05B 2219/45014; H01H 13/023; H01H 2221/016
USPC ......................... 187/247, 391, 394, 395, 396
See application file for complete search history.

(56) References Cited

U.S. PATENT DOCUMENTS

| D283,685 S | * | 5/1986 | Walser | ........................ D10/108 |
| 4,805,739 A | * | 2/1989 | Lind | ....................... B66B 1/462 |
| | | | | 187/394 |
| 5,460,118 A | | 10/1995 | Shea et al. | |
| 5,507,366 A | | 4/1996 | Huang | |
| 5,780,790 A | * | 7/1998 | Benson | ..................... B66B 3/00 |
| | | | | 187/395 |

(Continued)

FOREIGN PATENT DOCUMENTS

| CN | 202007061 U | 10/2011 |
| EP | 0 190 407 A1 | 8/1986 |

(Continued)

*Primary Examiner* — Anthony Salata
(74) *Attorney, Agent, or Firm* — Birch, Stewart, Kolasch & Birch, LLP

(57) ABSTRACT

A call panel for an elevator including a call panel frame, an essentially planar front surface, a center panel connected to the call panel frame, and at least one call pushbutton also connected to the call panel frame. The at least one call pushbutton has teeth which fit into corresponding teeth of the call panel frame such that a gap between the at least one call pushbutton and the call panel frame is minimized.

16 Claims, 6 Drawing Sheets

(56) References Cited

U.S. PATENT DOCUMENTS

Figure 3:
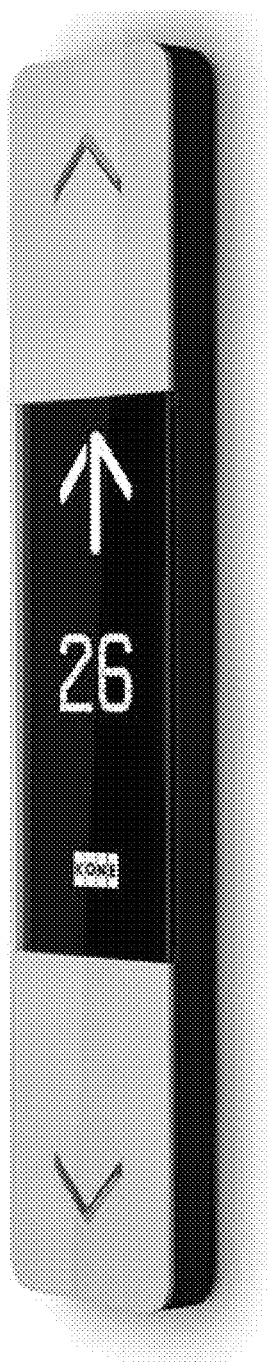

| | | | | |
|---|---|---|---|---|
| 7,377,365 B2* | 5/2008 | Abe | ................ | B66B 1/2416 |
| | | | | 187/396 |
| 7,404,470 B2* | 7/2008 | Felder | ................ | B66B 1/462 |
| | | | | 187/395 |
| 7,766,129 B2* | 8/2010 | Makela | ................ | B66B 1/20 |
| | | | | 187/382 |
| 8,136,636 B2* | 3/2012 | Bahjat | ................ | B66B 1/463 |
| | | | | 187/391 |
| 8,348,022 B2* | 1/2013 | Rusanen | ................ | B66B 1/461 |
| | | | | 187/391 |
| D705,723 S * | 5/2014 | Saikawa | ................ | D13/108 |
| 8,746,415 B2* | 6/2014 | Aluisetti | ................ | B66B 1/468 |
| | | | | 187/391 |
| 8,807,287 B2* | 8/2014 | Li | ................ | B66B 1/461 |
| | | | | 187/391 |
| 9,193,564 B2* | 11/2015 | Yuasa | ................ | B66B 3/02 |
| 9,315,362 B2* | 4/2016 | Felis | ................ | B66B 3/004 |
| 2005/0173201 A1 | 8/2005 | Meyer | | |
| 2005/0224297 A1 | 10/2005 | Felder et al. | | |

FOREIGN PATENT DOCUMENTS

| | | |
|---|---|---|
| EP | 0190407 B1 | 5/1989 |
| JP | 11-263545 A | 9/1999 |
| JP | 2007-84218 A | 4/2007 |
| WO | WO 2009/101241 A1 | 8/2009 |

* cited by examiner

FIG. 1
FIG. 2
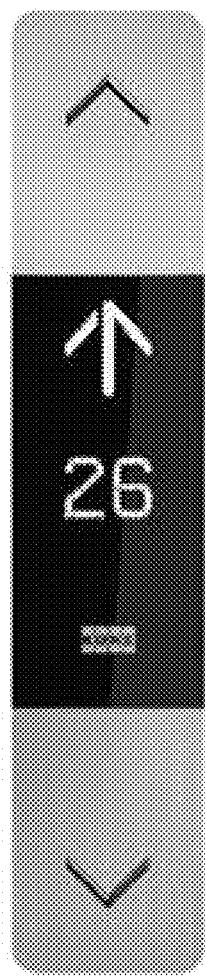
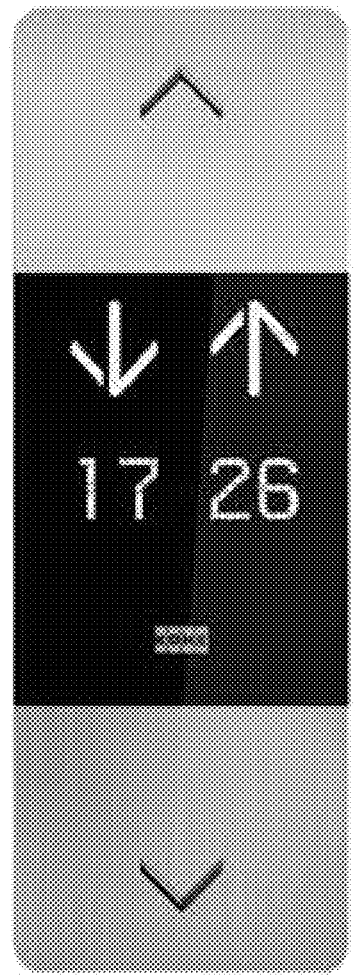

US 9,821,982 B2

1
CALL PANEL FOR AN ELEVATOR

The object of the invention is a call panel for an elevator as defined in the preamble of claim 1.

An elevator call is most usually given with call pushbuttons, e.g. with pushbuttons on which a direction arrow or floor number or other symbol is marked.

The aim of the present invention is to improve the clarity as well as the usability of an elevator panel.

The characteristic features with regard to a call panel according to the invention are referred to in the claims.

The call panel applying the invention comprises an essentially planar front surface and a center panel bounding the front surface and a call pushbutton separate from the center panel and belonging to the front surface. Essentially planar means in this context that to the passenger the surfaces of the parts of the panel are, when inspected visually, parallel and that no significant thresholds are felt when touching the borders of the parts. The invention is primarily applied in an implementation of a landing call device for an elevator.

Preferably the center panel is a display panel, comprising a display device able to display at least one alphanumeric or other symbol or graphical information.

By disposing the call pushbuttons above or below the center panel according to whether an up call pushbutton or down call pushbutton is in question, an intuitive understanding for the user about the purpose of the pushbuttons is achieved without separate guidance. Conventionally, an arrow figure or corresponding is used in up pushbuttons and down call pushbuttons as a user guide. In practical situations the position of the pushbutton can replace, or at least reinforce the guidance to be obtained from an arrow figure.

The information brought to a user by a call panel becomes clearer when the panel is presented to the user as just a center panel containing a possible call panel and as call pushbuttons. Preferably the center panel has information about the floor on which the call panel is situated. The display of the center panel can present information about calls and about the movement of the elevator.

Pressing a call pushbutton produces movement between the center panel and the call pushbutton. Limits are arranged for the relative movement as also is returning in the structure of the call panel. Preferably pressing a call pushbutton causes folding of the call pushbutton in relation to the plane of the center panel, which is arranged by hinging the center panel and a call pushbutton to each other either directly or via a support structure. Just a slight folding of a call pushbutton maintains the impression given to the user of preserving an unbroken front surface of the call panel but nevertheless gives an impression that the call pushbutton responds when giving a call.

The gap that is on the edges of the call panel, between the pushbuttons and the frame of the call panel, and that is visible to the exterior is preferably protected from penetration with an obstructing structure formed in the gap. This structure preventing penetration can be in only a part of the length of the gap visible outwards or more preferably can extend for the whole length of the gap. A preferred preventive structure is toothing, on the frame of the call panel or on a pushbutton of the call panel or on both of these, extending into the gap. By making the toothing alternate in such a way that the teeth interleave in the gap, the gap can be made to be in practice closed.

Figure 4:
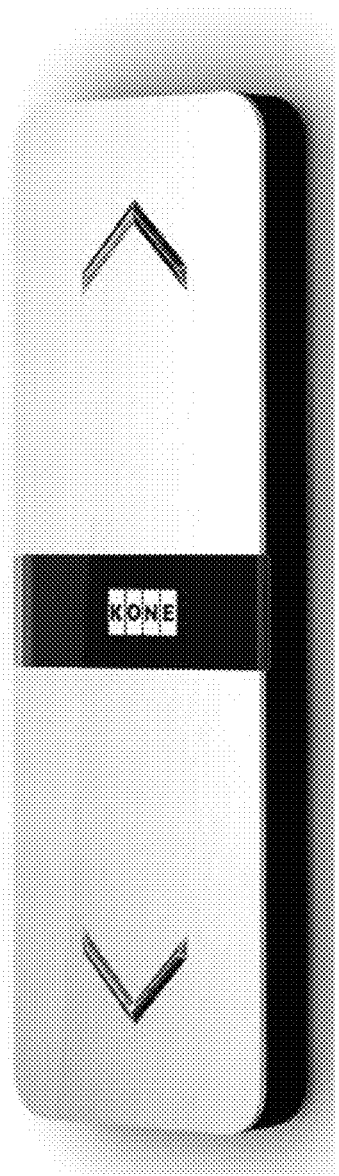
Figure 5:
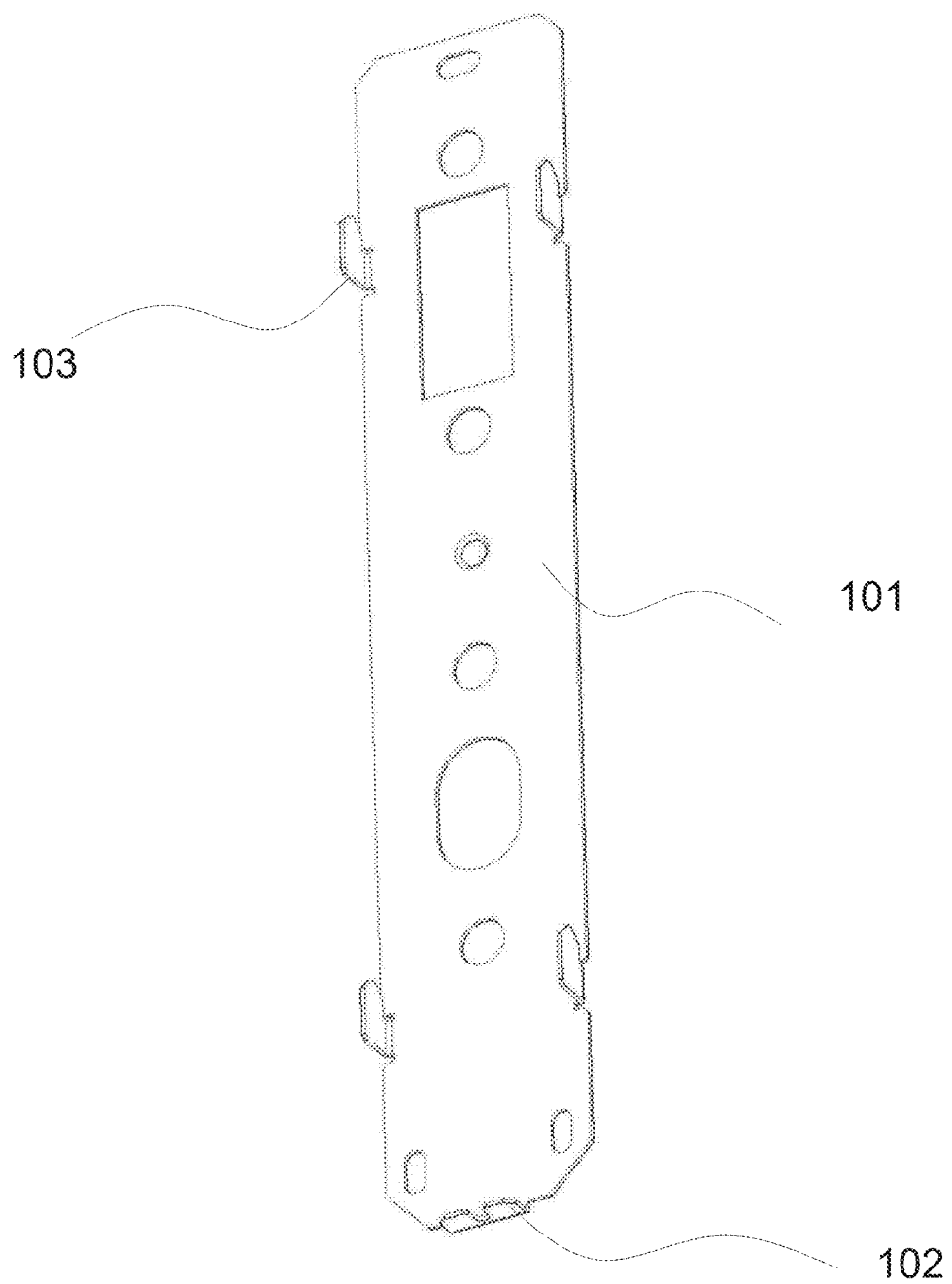
Figure 6:
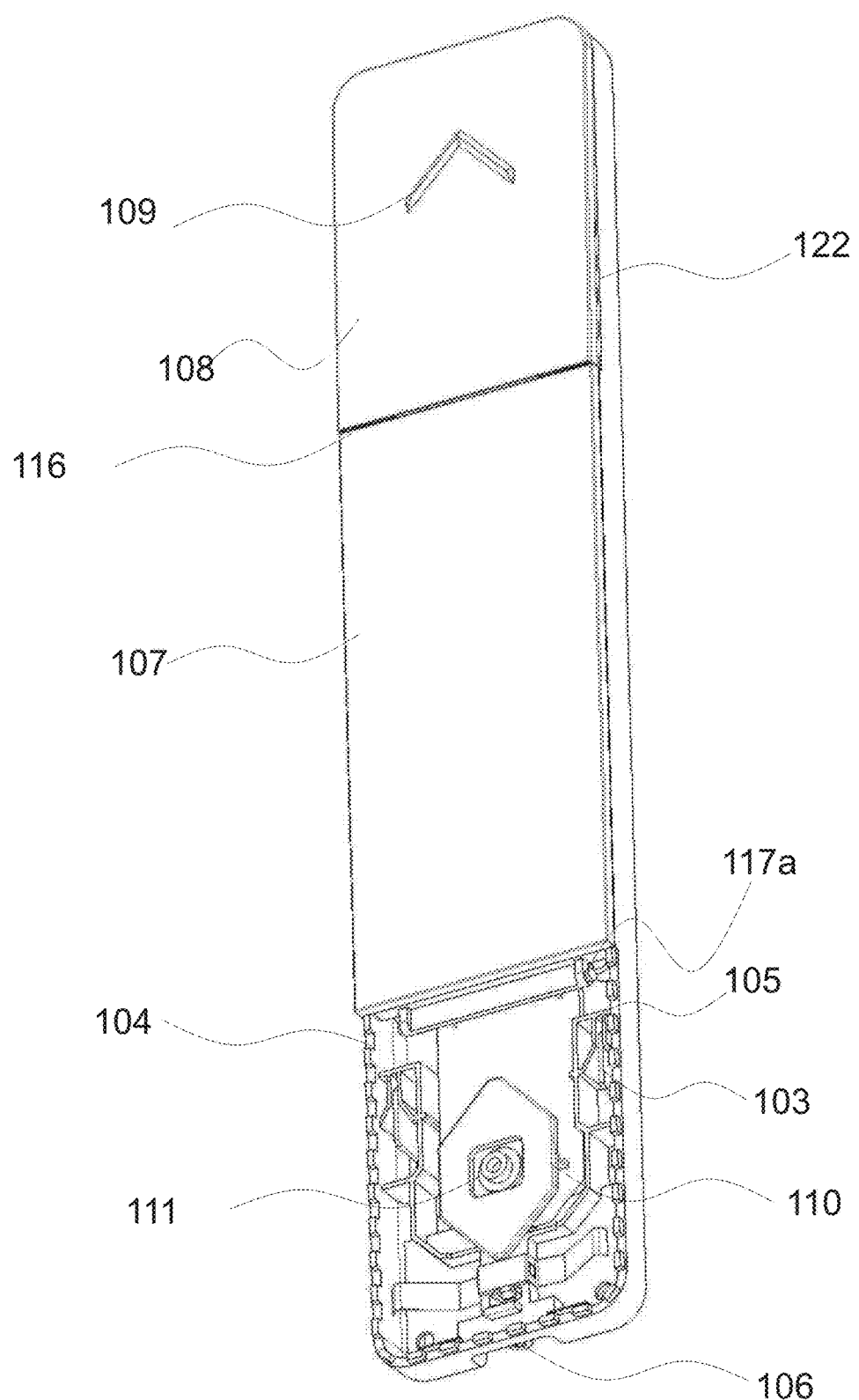
Figure 7:
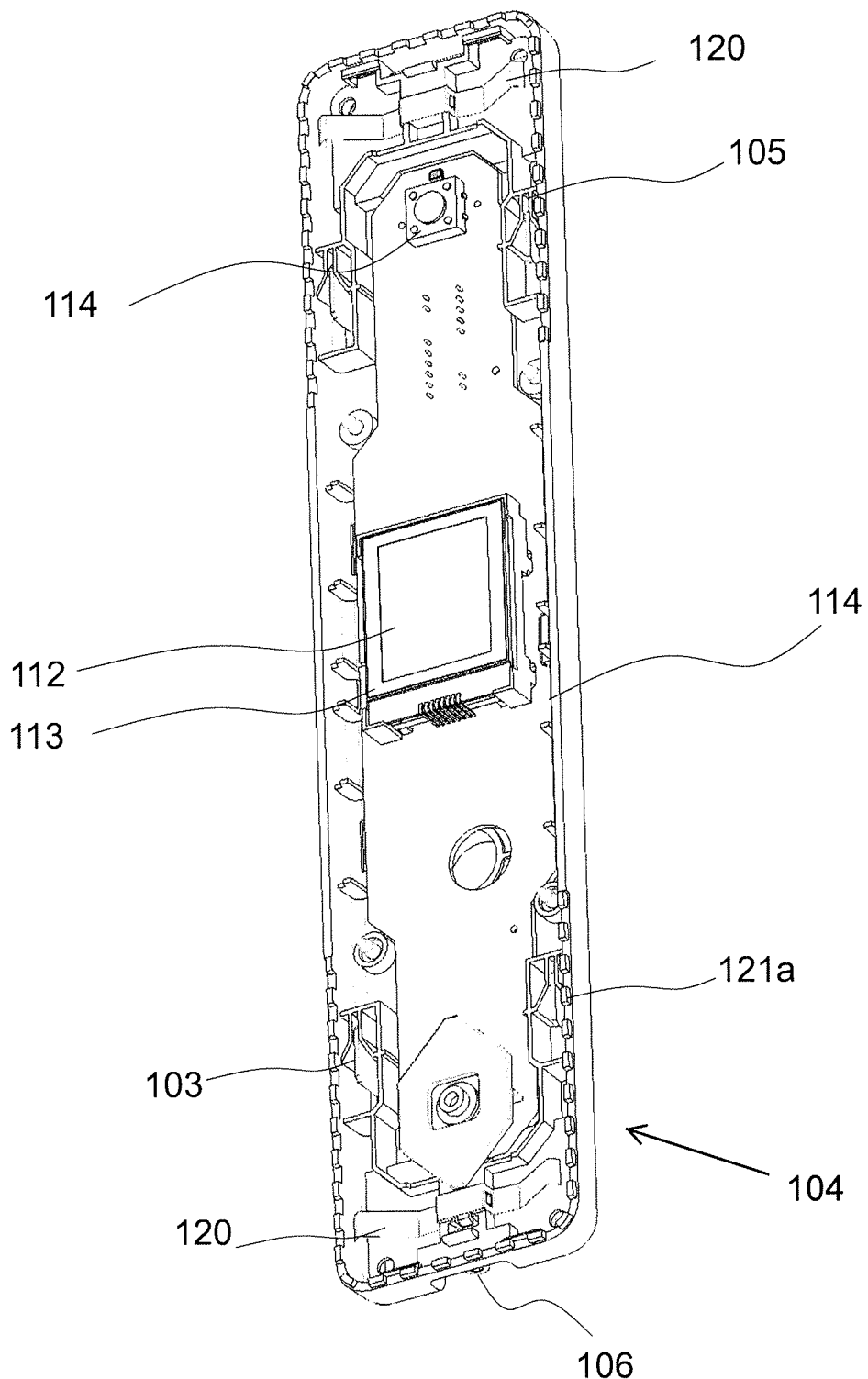
Figure 8:
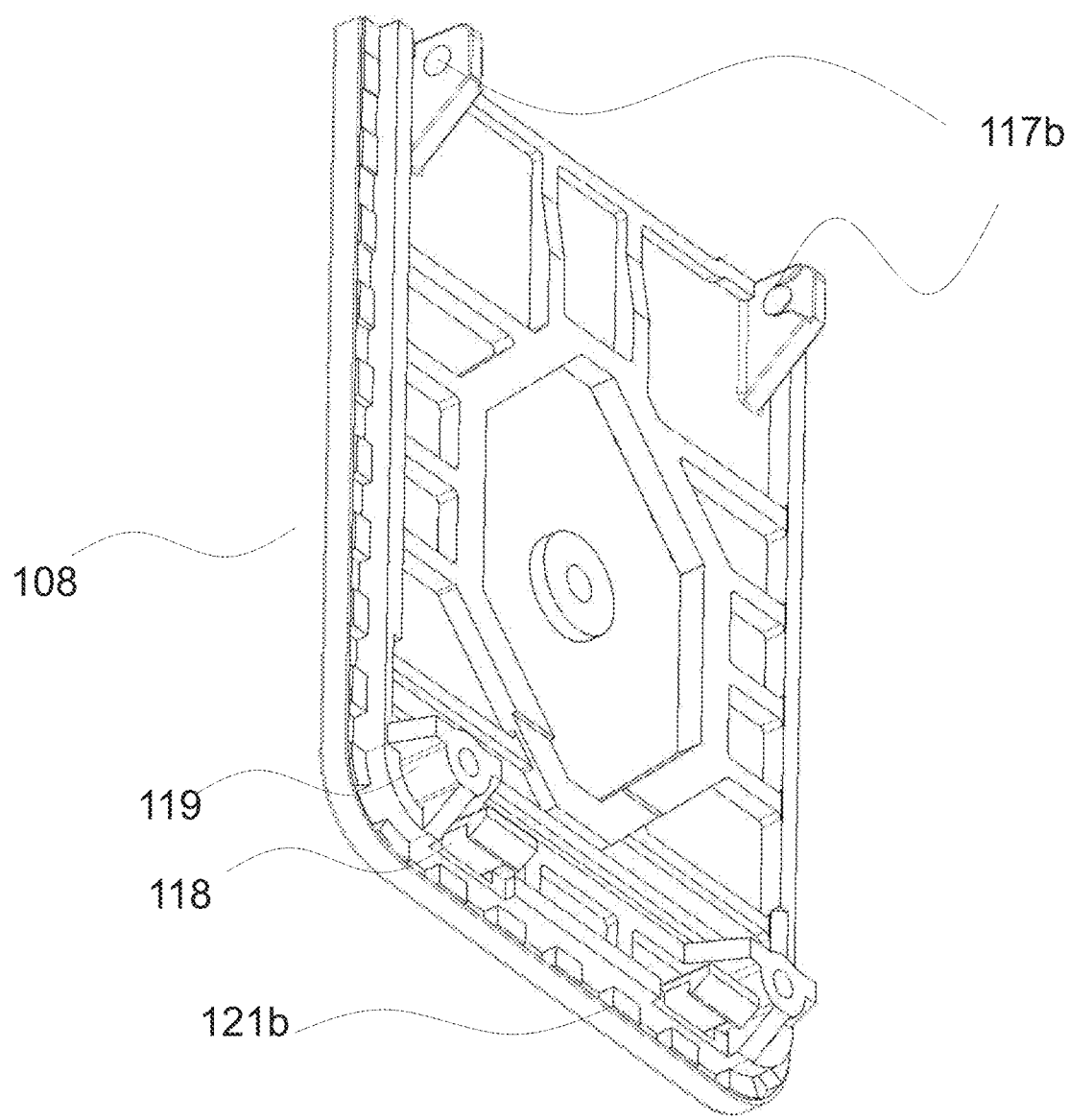

In the following, the invention will be described in detail with reference to the attached drawings, wherein FIG. 1 presents a front view of a call panel applying the invention, 2
FIG. 2 presents a front view of a second call panel applying the invention, FIG. 3 presents the call panel of FIG. 1, as viewed from the front and right, FIG. 4 further presents a call panel applying the invention, as viewed from the front and right, FIG. 5 shows a wall fastener of a call panel, FIG. 6 presents a call panel when partly opened, FIG. 7 shows a call panel when partly equipped, and FIG. 8 shows a pushbutton of a call panel.

In the embodiments of FIGS. 1-4 of the drawings the center panel of the call panel is dark and the call pushbuttons above and below the center panel are lighter. On the call pushbuttons is an arrow figure, either an up arrow or a down arrow. In the center part in FIGS. 1, 2 and 3 is a display, on which is presented with a direction arrow the direction of travel of the elevator and with alphanumerical marks the floor information. Depending on the properties of the display, also other information can also be presented with the display. The call panels of FIGS. 1, 3 and 4 are primarily intended as call panels of individual elevators, but they are suited for use also as call panels of an elevator group of two or more elevators. The call panel of FIG. 2 is more particularly intended to be the call panel of a group of two elevators. In the call panel of FIG. 2 the display is arranged to present two different sets of floor and direction data of the elevator. By arranging the display differently or with another type of display than that presented in the figure, the call panel of the figure can be applied more generally also than in groups of two elevators.

In the call panel of FIG. 4 the center panel does not have a display device.

FIG. 5 shows a wall fastener of the call panel. Preferably the wall fastener is fabricated from metal plate. Shapes that protrude from the plane of the plate and increase rigidity can be made in it by pressing or bending. The wall fastener 101 comprises hook-shaped support parts 103, supported by which the actual frame of the call panel is suspended. A preferred method for forming a wall fastener is to fabricate it from one piece of plate, in which case the support parts are the same piece as it, and bent to protrude at the edges of the plate piece outwards from the wall. Likewise the wall fastener comprises a locking detent 102, to which the frame of the call panel is fixed with a fixing screw or with another suitable locking means or fixing means. The wall fastener preferably also comprises one or more holes or an edge slot from which the wall fastener can be fixed to the wall with a screw fixing or corresponding. The wall fastener preferably also comprises at least one hole, a signal conductor or other interface or signal conductors can be brought into the call panel. Preferably the wall fastener also comprises holes receiving the protrusions of the frame of the call panel or components fixed to the frame or giving space to these.

FIG. 6 shows the call panel without the lower pushbutton and FIG. 7 the frame 104 of the call panel partly equipped with the components to be connected to it. FIG. 8 shows a rear view of a pushbutton of the call panel.

The frame 104 of the call panel fixes to the support parts 103 by means of the countershapes 105 formed in the frame. The frame comprises a threaded hole 106, into which comes a fixing screw gripping to the locking detent 102 of the wall fastener 101. The locking between the wall fastener and the frame of the call panel can be done otherwise, e.g. with a snap-on joint, which can be opened via the hole 106, in which case the hole does not need to be threaded.

The center panel 107 and the pushbuttons 108 are connected to the frame 104 of the call panel. The front surfaces of the center panel and of the pushbuttons are on essentially the same plane. On the pushbuttons there is preferably a direction arrow or other marking indicating the purpose of the pushbutton, e.g. for an up call there is an upward-pointing, more or less stylized arrow FIG. 109. Preferably the arrow figure or other marking is translucent through the pushbutton and it can be illuminated with a luminaire 110 to be disposed in the frame. The luminaire 110 can be resolved in many ways. The luminaire seen in FIGS. 6 and 7 comprises as its base part a photoconductive plate piece, which is shaped to radiate light primarily from its edges, and a photodiode 111 (LED) supplying light into the plate piece 110.

The center panel 107 is visually distinguishable from the pushbuttons. The center panel can itself form the display or more preferably the center panel 107 is a transparent structure, possibly darkened or shaded, behind which is a separate display device 112. Preferably also an internal control unit 113 of the call panel is in connection with or in the position of the display device, which control unit is in connection with the rest of the elevator system. The control unit 113, display device 112 and other electrical or electronic components of the call panel are disposed and connected on a circuit board 114, which is supported in its position on the frame 104 of the call panel. On the circuit board 114 is also a sound source 115, preferably a loudspeaker, with which information relating to the operation of the elevator, e.g. an arrival at floor ring or even verbal information, is given. In addition, the sound source can be used to give a feedback sound about the pressing of a pushbutton.

The pushbuttons 108 are, at their center panel end, hinged to the center panel 107 or to the frame 104 with a hinge arrangement 117a, 117b in the proximity of the juncture line of the center panel 107 and the pushbutton 108. The pushbutton 104 comprises holding claws 118, which grip detent points in the frame 104 and limit the pushbutton from folding around its hinging outwards from the plane of the center panel 107. Support pillars 119 on the pushbutton when they meet the frame limit the folding of the pushbutton when the pushbutton is pressed. Movement of the pushbutton 108 is supported and sprung with a spring 120. In connection with the spring 120 is a sensor, e.g. a switch, which indicates pressing of the pushbutton. The sensor can be disposed otherwise than in connection with the spring.

The center panel 107 and the pushbuttons 108 are configured to extend over the frame 104 of the call panel 104 in such a way that as viewed directly from the front the frame is covered behind them. Preferably at least the center panel covers, even more preferably also a pushbutton covers, at least to some extent, the sides of the frame, in which case the gap 122 between the front surface of the call panel and the frame is difficult to penetrate. Owing to the play between the frame 104 and the pushbutton 108, the gap between them is difficult to close, at least if the aim is to even approximate the same visual appearance as at the point of connection of the frame 107 and the center panel. Interleaving toothing 121a, 121b is fitted in the gap 122 between the frame 104 and a pushbutton 108. The teeth 121a of the frame 104 of the call panel and the teeth 121b of a pushbutton 108 alternate in the gap 122 between the frame 104 and a pushbutton 108, effectively preventing penetration of the gap and thus protecting the call panel from being damaged and also from dirt. Suitably shaping and dimensioning the teeth on the edges of these pieces, the teeth can also function as reinforcing ribbing of the edges. Preferably the teeth are disposed to some extent inwards from the outer edge of the call panel. Likewise, preferably the teeth are disposed so close to the outer edge of the call panel that obtaining a proper grip under the edge of a pushbutton, e.g. with a fingernail, is difficult.

Presented in the examples are embodiments in which both an up call pushbutton and a down call pushbutton connect to the center panel. The call panel according to the invention can be implemented also in such a way that only either the up call pushbutton or down call pushbutton is connected to the center panel.

The invention is described above using examples with the aid of the attached drawings with different embodiments of the invention being possible within the scope of the inventive concept defined by the claims.

The invention claimed is:

1. A call panel for an elevator, said call panel comprising:
a call panel frame;
a center panel connected to the call panel frame; and
at least one call pushbutton connected to the call panel frame and separate from the center panel,
wherein the at least one call pushbutton comprises teeth which fit into corresponding teeth of the call panel frame,
wherein the teeth of the at least one call pushbutton and the teeth of the call panel frame are located at an outer edge of the call panel, and
wherein a front surface of the call panel, which comprises the center panel and the at least one call pushbutton, is essentially planar.

2. The call panel according to claim 1, wherein the center panel is a display panel, comprising a display device able to display at least one alphanumeric or other symbol or graphical information.

3. The call panel according to claim 1, wherein the call panel is a landing call device.

4. The call panel according to claim 1, wherein the call panel comprises at least one of the following: an up call pushbutton above the center panel, and a down call pushbutton below the center panel.

5. The call panel according to claim 1, wherein the front surfaces of the center panel and of the at least one call pushbutton form the front surface of the call panel.

6. The call panel according to claim 1, wherein the at least one call pushbutton is hinged a first end to the center panel or to the call panel frame proximate to the center panel.

7. The call panel according to claim 1, wherein the teeth on the call panel frame and the teeth on the at least one call pushbutton are arranged to alternately interleave.

8. The panel according to claim 2, wherein the call panel is a landing call device.

9. The panel according to claim 2, wherein the call panel comprises at least one of the following: an up call pushbutton above the center panel, and a down call pushbutton below the center panel.

10. The panel according to claim 3, wherein the call panel comprises at least one of the following: an up call pushbutton above the center panel, and a down call pushbutton below the center panel.

11. The panel according to claim 2, wherein the front surfaces of the center panel and of the at least one call pushbutton form the front surface of the call panel.

12. The panel according to claim 3, wherein the front surfaces of the center panel and of the at least one call pushbutton form the front surface of the call panel.

13. The panel according to claim 4, wherein the front surfaces of the center panel and of the at least one call pushbutton form the front surface of the call panel.

14. The panel according to claim 1, wherein the at least one call pushbutton comprises two call push buttons spaced apart from one another, with the center panel located between the two call push buttons, and
  wherein the teeth of the call panel frame are provided only at the locations of the two call push buttons.

15. The panel according to claim 1, wherein the teeth of the at least one call pushbutton project outwards from the at least call pushbutton towards the call panel frame.

16. The panel according to claim 6, wherein the call panel frame is provided with a spring abutting against the at least one call pushbutton and is spaced apart from said first end.

* * * * *